Patented Mar. 19, 1940

2,194,201

UNITED STATES PATENT OFFICE 2,194,201

ORGANIC COMPOUND AND METHOD OF PRODUCING THE SAME

Edgar I. Eisenstaedt, Chicago, Ill., now by judicial change of name Edgar I. Emerson No Drawing. Application June 11, 1938, Serial No. 213,278

18 Claims. (Cl. 260—310)

This invention relates to organic compositions of matter, and more particularly to organic compounds having the properties of dyes, dye intermediates, drugs and the like, and to methods of producing the same.

One object of the invention is the provision of a series of new organic compounds comprising reaction products and derivatives of reaction products of a pyrazolone compound with an aromatic compound.

Another object is the provision of methods of producing the foregoing and allied compounds in an economical manner and obtaining relatively high yields thereof.

Pyrazolone having a nitrogen containing group in the 4 position, or derivatives thereof, such as 1 phenyl, 2,3 dimethyl 4 amino pyrazolone 5 and also known as 4-aminoantipyrine are suitable materials for use in producing compounds of this invention. The nitrogen containing group in the 4 position is preferably either a nitroso group or a primary amine group. The foregoing pyrazolone compounds and derivatives thereof may be reacted with certain aromatic compounds to provide the new compounds of my invention. The dye substances of this invention are believed to have the following linkage:

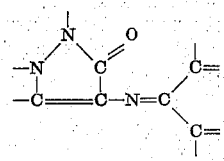

The dye substances of my invention may be easily reduced to their corresponding leuco compounds by treatment with a reducing agent such as sodium hydrosulfite or hydrogen sulfide. After such reduction, the leuco compounds are easily re-oxidized to the colored compounds upon exposure to air or by treatment with suitable oxidizing agents. The basic compounds of my invention form salts readily with mineral acids and in many instances with organic acids. Valuable intermediate compounds are also obtained in the formation of some of the leuco compounds and dyes.

In order that my invention may be more fully understood, the preparation of certain of the new compounds of my invention will be explained by way of example.

*Example I.*—The condensation product of 4-aminoantipyrine (1 phenyl 2,3 dimethyl 4 amino pyrazolone 5) with an aromatic primary, secondary or tertiary amine such as dimethylaniline may be readily prepared by oxidizing equimolecular proportions of the two constituents in an acid solution. One mole of 4-aminoantipyrine and 1 mole of dimethylaniline are dissolved in a suitable solvent such as water to which just sufficient acid has been added to render the dissolution of the aromatic amine complete. The solution is cooled by the addition of crushed ice and 4 moles of about 50% aqueous solution of ferric chloride hexahydrate is added with good stirring. If hydrochloric acid has been added to facilitate the dissolution of the dimethylamine, the hydrochloride of the dye may be precipitated by the addition of sodium chloride to the solution of the dye. The precipitated product is filtered off and washed with saturated sodium chloride solution until the residue in the filter is free of iron salts. The dye may then be freed of the sodium chloride solution on a filter press. The hydrochloride of the dye is soluble in water.

The perchlorate of the dye may be precipitated from aqueous solutions of the hydrochloride by the addition of either perchloric acid, or perchlorate salts such as magnesium perchlorate, or both. The perchlorate salt of the dye is less soluble in water than the hydrochloride.

The perchlorate salts of the dyes may also be prepared by the following modification of the above procedure giving better yields of a purer product. One mole of 4-aminoantipyrine is dissolved in water to which perchloric acid is added to cause the dissolution of 1 mole of dimethylaniline. The solution is cooled by the addition of crushed ice, and 4 moles of a 50% aqueous solution of ferric chloride is added slowly to the cooled solution with stirring. The perchlorate salt of the dye separates as small crystals having a gold reflex. The separation is completed by the addition of sodium chloride. The dye is brought on a filter and washed with a saturated solution of sodium chloride until the dye is free of iron salts. Finally it is washed with cold water until it is free of sodium chloride. The dye may then be dried in the open air and is completely ashless upon ignition.

Under the foregoing conditions, the following reaction is believed to take place by the splitting off of hydrogen atoms.

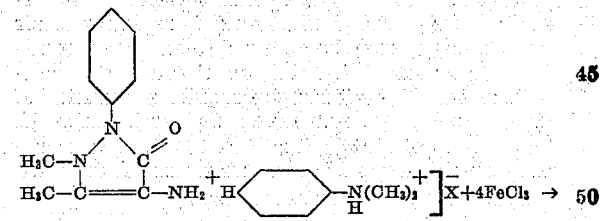

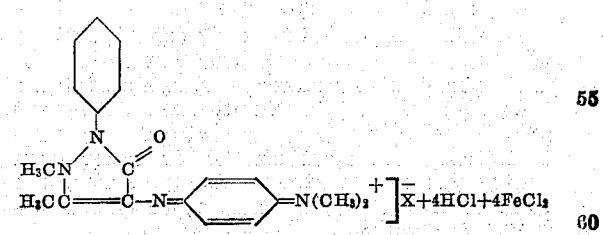

Various other aromatic amines and derivatives thereof may be similarly condensed with 4 amino-antipyrine or other pyrazolone compounds having a primary amine group in the 4 position, and a substituent in the 2 position. The 1 and 3 positions may or may not be substituted. The only exceptions of the class of aromatic amines known to me are the use of a para substituted aromatic amine or an aromatic amine having a nitro group in the ortho or meta position. Other oxidizing agents may be used in place of ferric chloride, the choice of oxidizing agent depending on the particular ingredients to be reacted and the procedure for reaction selected. For example, manganese dioxide in dilute acid solution is admirably suited for some reactions. For the oxidation of a mixture of 4 aminoantipyrine and diphenylamine I prefer to use potassium or sodium dichromate using dilute acetic acid as a solvent. Just sufficient of the acid, either organic or mineral, should be present to convert the pyrazolone compound used to a salt of the acid. Potassium permanganate is also suitable as an oxidizing agent with certain compounds, care being taken to keep the solution acid to litmus as the reaction proceeds. By this procedure the acid salt such as the hydrochloride, perchlorate, or acetate of the condensation product is obtained directly.

*Example II.*—The compounds of my invention may also be prepared by the reactions of certain substituted halogen derivatives of aromatic compounds with 4-aminoantipyrine or allied pyrazolone primary amines. Thus 2,4-dinitrochlorbenzene reacts directly with 4-aminoantipyrine according to the following equation:

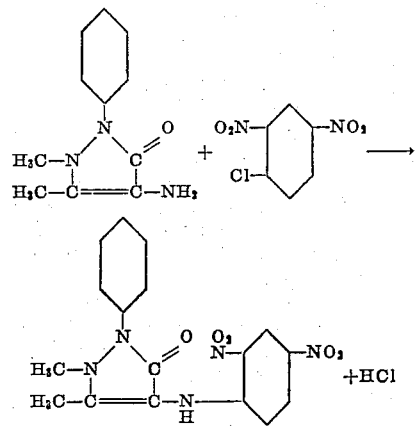

The dinitro compound produced by the above reaction can be reduced to the corresponding diamino compound by such reducing agents as zinc, tin or iron, acting in acid solution. The diamino body, a leuco compound, is sensitive to air oxidation and may be oxidized to the corresponding dye either by blowing air through the solution of it or by adding the requisite quantity of an oxidizing medium, such as ferric chloride. The air oxidation is facilitated by the addition of a soluble cupric salt to solutions of the diamine.

*Procedure for the production of 2,4-dinitrophenylaminoantipyrine*

*Procedure I.*—A mixture of equal parts by weight of 2,4-dinitrochlorbenzene and 4-aminoantipyrine, well ground together, is heated in the open air to about 110° C. until the reddish melt solidifies to an orange red solid. Purified by crystallization from ethyl alcohol, or better from boiling chlorbenzene, the reaction product in the form of orange crystals melting between 213°–215° C. is obtained.

*Procedure II.*—The condensation of 2,4-dinitrochlorbenzene with 4-aminoantipyrine may be carried out in a similar manner at a lower temperature in the presence of sodium carbonate. Two parts by weight of 4-aminoantipyrine, and 2 parts of 2,4-dinitrochlorbenzene are well ground with 1 part of anhydrous sodium carbonate. The mixture is heated on a steam bath until the melt solidifies to an orange red solid. The inorganic salts may be freed from the product by washing it with water, and the residual product may be used directly, or the original product may be purified by crystallization from alcohol, chlorbenzene or any other suitable solvent.

*Reduction of 2,4-dinitrophenylaminoantipyrine and the subsequent oxidation of the leuco compound thus obtained*

The nitro compound is dissolved in a minimum amount of concentrated hydrochloric acid 37% and the solution treated with iron, zinc or tin until the reduction of the dinitro compound is complete, as noted by the disappearance of its yellow color. If iron has been used as the reducing agent, the resulting solution, after dilution by adding 300 c. c. of water to each 100 c. c. of solution, may be treated with the requisite amount of an oxidizing agent such as two equivalents of a 50% solution of ferric chloride. The red dye separates almost at once. Solid sodium chloride is added to the solution to complete the separation of the product. The dye may be purified by crystallization from hot water, preferably not hotter than 95° C. It crystallizes in red needles which turn darker when dry. The absorption spectrum of the dye shows it to have a maximum absorption between 4700–4900 A.

This same dye may also be produced by oxidizing an aqueous solution of m-phenylenediamine and 4-aminoantipyrine with a suitable oxidizing agent such as ferric chloride. This latter procedure is similar to Example I.

The dinitro compound is believed to be reduced by the above treatment in accordance with the following equation:

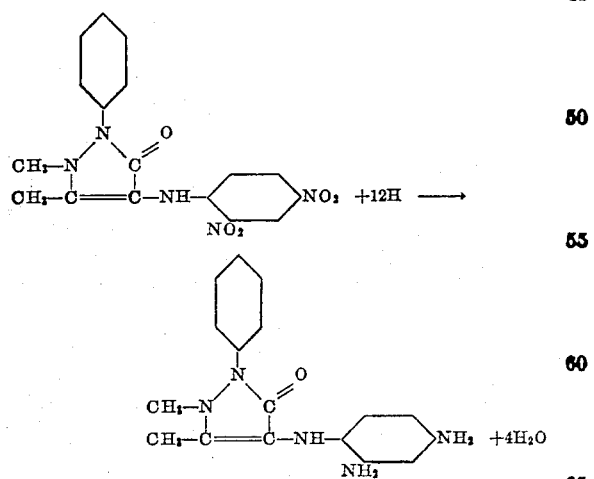

Upon oxidation of the leuco compound, the following reaction is believed to take place:

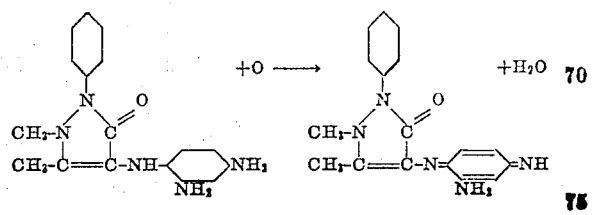

*Example III.*—Pyrazolone compounds containing a nitroso group in the 4 position, such as 4-nitrosoantipyrine may be condensed with secondary and tertiary aromatic amines in which the para position is free, to produce condensation products having the properties of dyes. For example nitrosoantipyrine will react readily with diphenylamine under the following conditions. Equimolar portions of diphenylamine and 4-nitrosoantipyrine are mixed with a suitable solvent, such as acetic or formic acid, acetone or methyl or ethyl alcohol. Acetic acid has been found to be particularly suitable for this purpose. The nitrosoantipyrine is very limitedly soluble in acetic acid, but in the presence of strong acids it dissolves in acetic acid quite readily. One mole, or preferably a slight excess over 1 mole, of concentrated hydrochloric acid is added to the acetic acid and nitrosoantipyrine mixture. When dissolution of the nitrosoantipyrine is complete, a dehydrating agent such as acetic anhydride is added slowly and with stirring. The quantity added should be that calculated to remove the water, introduced by the acetic acid and the hydrochloric acid as well as the water formed by the condensation of diphenylamine with nitrosoantipyrine. The temperature of the reaction is preferably kept below 15° C. The dye can be isolated from the reaction mixture by adding this mixture to an organic solvent in which the dye is insoluble, such as ether, or the mixture can be poured into water and the dye salted out. The dye is a pure blue, limitedly soluble in water, but soluble in solvents, such as alcohol, acetone, acetic and formic acid. The completeness of the reaction may be determined by adding 2 drops of the reaction mixture to about 1 c. c. of ethyl alcohol followed by the addition of 5 c. c. of distilled water. If the resulting solution is not clear, it indicates the presence of unreacted diphenylamine. When the test gives a clear solution the reaction is considered complete.

This dye may also be made by oxidizing a mixture of 4-aminoantipyrine and diphenylamine and following the general procedure of Example I.

In the foregoing condensation, I believe the following reactions between nitrosoantipyrine and diphenylamine take place:

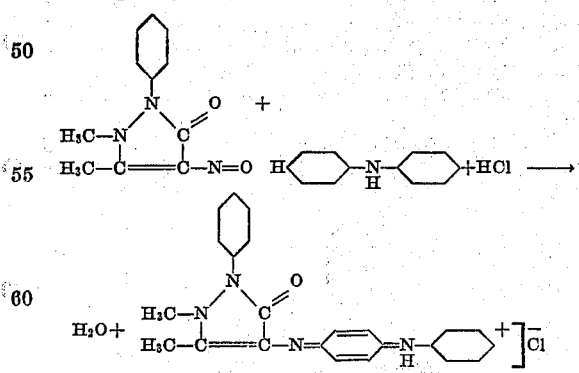

*Example IV.*—Under the proper conditions, equimolar mixtures of 4-aminoantipyrine with a phenol can be oxidized to dye stuffs. The para position of the phenol must be free. The dyes produced are best used as vat dyes, i. e., the leuco base of the dyes are applied to the fibre and allowed to develop the color on the fabric. The oxidation to prepare the dye may be carried out in an aqueous medium containing ammonium hydroxide in sufficient quantity to prevent the precipitation of cupric hydroxide. A copper salt such as cupric sulphate or cupric chloride is added to the solution containing the 4-aminoantipyrine and phenol, and air is passed through the solution until no more of the dye forms. It is not necessary to use a theoretically exact quantity of the copper salt, but the reaction is greatly accelerated if excess quantities are used. The reaction is considered to be as follows:

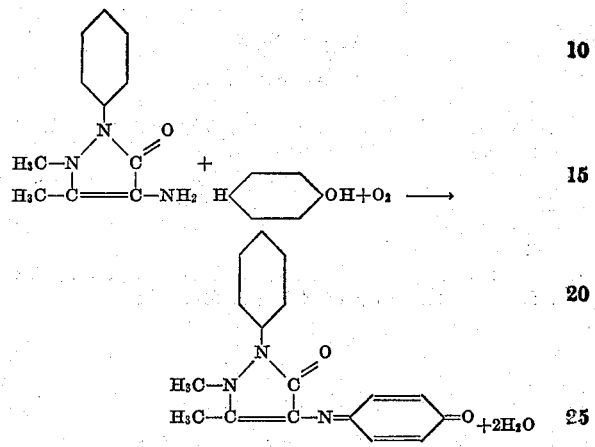

When an equimolar mixture of phenol and 4-aminoantipyrine is oxidized in the manner mentioned above, a red dye is formed which separates from the solution as a mass of red crystals. The dye is slightly soluble in water, soluble in acetone, acetic acid and alcohol.

4-amino- and 4-nitrosoantipyrine have been referred to particularly for purposes of this invention because of their economic advantages but it is to be understood that other pyrazolone compounds having a primary amino or nitroso radical in the 4 position and having the 2 position substituted are also to be considered within the scope of this invention. While benzene derivatives have been mentioned particularly for condensation with pyrazolone compounds, it is to be understood that any compound of the benzenoid group such as naphthalene, anthracene, phenanthrene, or derivatives thereof which upon oxidation form an alternating single and double bond ring structure connected by a double bond to the nitrogen in the 4 position of the pyrazolone compound may be employed.

The condensation products of my invention are colored in the oxidized state varying with their composition in color and intensity through chiefly the reds, blues and greens. In general they are soluble in water and alcohol and suitable for use as dyes. They may be readily applied directly to fabrics such as wool, silk and other animal fibres by dissolving the dye in a suitable solvent such as water, alcohol, or a mixture thereof and dyeing the fabric in the solution. These dyes are direct acting on animal fibres although mordants may be used if desired. Vegetable fibres may also be dyed by the use of proper mordants such as tannic acid for basic dyes or lake forming compounds for acid dyes. Some of the products of my invention may also be used as indicators, and some of the intermediate compounds, particularly the intermediate nitro compounds obtained by the procedure of Example II, are believed to have valuable pharmaceutical properties.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. As a new composition of matter a colored substantially neutral organic compound having the formula

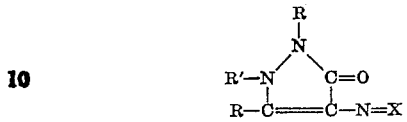

in which R is a substance of the group consisting of hydrogen, alkyl and aryl radicals, R' is a radical of the group consisting of alkyl and aryl radicals, and X represents a quinoid system the nucleus of which is joined directly to the nitrogen.

2. A new composition of matter comprising an organic compound having the formula

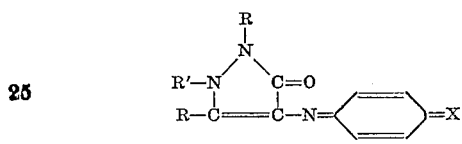

in which R is a substance of the group consisting of hydrogen, alkyl, and aryl radicals, R' is a radical of the group consisting of alkyl and aryl radicals, and X represents a bivalent non-metallic element or radical.

3. A substantially neutral organic compound having the formula

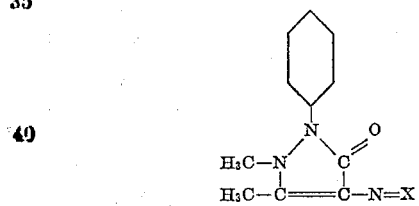

in which X represents a quinoid system.

4. A composition of matter comprising an organic condensation product having the formula

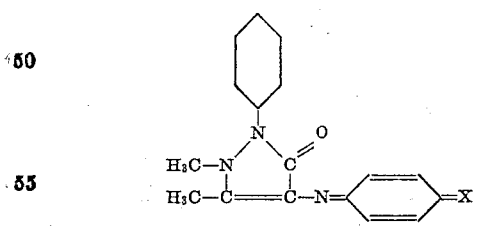

in which X represents a bivalent non-metallic element or radical.

5. A new composition of matter comprising an organic condensation product having the formula

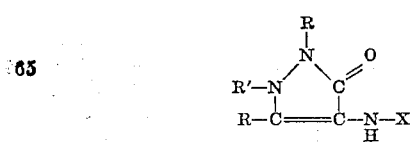

in which R is a substance of the group consisting of hydrogen, alkyl and aryl radicals, R' is a radical of the group consisting of alkyl and aryl radicals, and X is an aromatic radical having its aromatic nucleus joined directly to the 4-amino nitrogen.

6. A new composition of matter comprising an organic condensation product having the formula

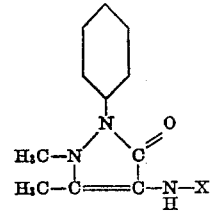

in which X is an aromatic radical the nucleus of which carries a nitrogen containing group in an ortho or para position with respect to the nitrogen to which said radical is joined.

7. A new composition of matter comprising an organic condensation product having the formula

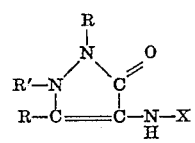

in which R is a substance of the group consisting of hydrogen, alkyl and aryl radicals, R' is a radical of the group consisting of alkyl and aryl radicals, and X represents an aromatic radical the nucleus of which carries two nitro groups in the ortho and para position with respect to the nitrogen to which said radical is joined.

8. A new composition of matter comprising an organic condensation product having the formula

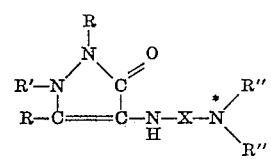

in which R is a substance of the group consisting of hydrogen, alkyl and aryl radicals, R'' is a substance of the group consisting of hydrogen, alkyl and aryl radicals but not both aryl radicals, R' is a radical of the group consisting of alkyl and aryl radicals, and X represents an aromatic radical the nucleus of which is directly joined to the unstarred nitrogen and carries the starred nitrogen group ortho or para to the unstarred nitrogen.

9. A new composition of matter comprising an organic condensation product having the formula

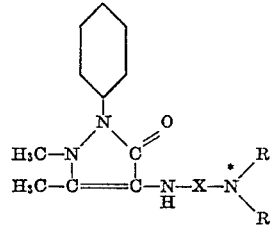

in which R and R' are substances of the group consisting of hydrogen, alkyl and aryl radicals but not both aryl radicals, and X represents an aromatic radical the nucleus of which is directly joined to the unstarred nitrogen and carries the starred nitrogen group ortho or para to the unstarred nitrogen group.

10. A new composition of matter comprising an organic condensation product having the formula

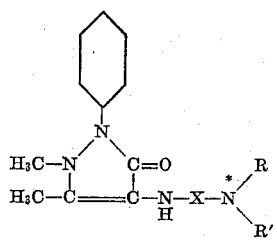

in which R and R' are substances of the group consisting of hydrogen, alkyl and aryl radicals, but not both aryl radicals, and X represents an aromatic radical the nucleus of which is directly joined to the unstarred nitrogen and carries the starred nitrogen group para to the unstarred nitrogen group.

11. A method of preparing an organic condensation product comprising treating a mixture of a 2 substituted pyrazolone compound having a nitrogen containing radical of the class consisting of primary amino and nitroso radicals in the 4 position and an aromatic compound of the class consisting of aromatic amines, nuclear halogenated substituted benzenoid compounds, and phenols with a condensing agent to produce a condensation product having the nucleus of the aromatic compound joined directly to the pyrazolone compounds.

12. A method of preparing an organic condensation product comprising treating a mixture of a 2 substituted pyrazolone compound having a primary amine group in the 4 position and a compound of the class consisting of aromatic amines and phenols in solution with an oxidizing agent to produce a condensation product having the nucleus of the aromatic compound joined directly to the pyrazolone compounds.

13. A method of preparing an organic condensation product comprising heating a mixture of a 2 substituted pyrazolone compound having a primary amine group in the 4 position and a nuclear halogenated substituted benzenoid compound until the maximum yield of the condensation product has been produced to produce a condensation product having the nucleus of the aromatic compound joined directly to the pyrazolone compounds.

14. A method of preparing an organic dye comprising heating a mixture of a 2 substituted pyrazolone compound having a primary amine group in the 4 position and a nuclear halogenated nitro substituted benzenoid compound until the condensation is effected, reducing the condensation product to a leuco compound, and oxidizing said leuco compound to the organic dye.

15. A method of preparing an organic condensation product comprising treating a mixture of a 2 substituted pyrazolone compound having a nitroso group in the 4 position and an aromatic benzenoid amine with a dehydrating agent to produce a condensation product having the nucleus of the aromatic compound joined directly to the pyrazolone compounds.

16. A method of preparing a new organic condensation product comprising treating a mixture of a 2 substituted pyrazolone compound having a primary amine group in the 4 position and a phenol in solution with an oxidizing agent to produce a condensation product having the nucleus of the aromatic compound joined directly to the pyrazolone compounds.

17. A new composition of matter comprising a condensation product having the formula

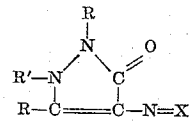

in which R is a substance of the group consisting of hydrogen, alkyl and aryl radicals, R' is a radical of the group consisting of alkyl and aryl radicals, and X is a substance selected from the group consisting of quinoid systems, the nucleus of which is found directly to the nitrogen and a combination of a hydrogen atom attached to one bond and an aromatic radical having its benzenoid nucleus directly attached to the other bond.

18. A new composition of matter comprising a condensation product having the formula

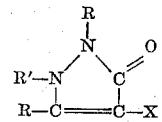

in which R is a substance of the group consisting of hydrogen, alkyl and aryl radicals, R' is a radical of the group consisting of alkyl and aryl radicals, and X is a radical containing a nitrogen atom attached to the pyrazolone ring in the 4 position, said radical including an aromatic nucleus attached directly to said nitrogen atom.

EDGAR I. EISENSTAEDT,
*Now by Judicial Change of Name Edgar I. Emerson.*